United States Patent
Lim et al.

(10) Patent No.: US 12,217,738 B2
(45) Date of Patent: Feb. 4, 2025

(54) METHOD FOR GENERATING TRAINING DATA AND METHOD FOR POST-PROCESSING OF SPEECH RECOGNITION USING THE SAME

(71) Applicant: Korea University Research and Business Foundation, Seoul (KR)

(72) Inventors: Heuiseok Lim, Seoul (KR); Chanjun Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 247 days.

(21) Appl. No.: 17/739,383

(22) Filed: May 9, 2022

(65) Prior Publication Data

US 2022/0366894 A1     Nov. 17, 2022

(30) Foreign Application Priority Data

May 11, 2021     (KR) .......................... 10-2021-0060914

(51) Int. Cl.
*G10L 15/06*     (2013.01)
*G06F 40/166*    (2020.01)
*G10L 13/00*     (2006.01)

(52) U.S. Cl.
CPC .......... *G10L 15/063* (2013.01); *G06F 40/166* (2020.01); *G10L 13/00* (2013.01)

(58) Field of Classification Search
None
See application file for complete search history.

(56) References Cited

U.S. PATENT DOCUMENTS

| | | | |
|---|---|---|---|
| 2015/0006168 A1* | 1/2015 | Mysore | G10L 25/84 704/233 |
| 2017/0323653 A1* | 11/2017 | Hassan al Banna | G10L 25/84 |
| 2019/0285671 A1* | 9/2019 | Ventola | H02J 3/40 |
| 2023/0162723 A1* | 5/2023 | Cui | G10L 15/26 704/9 |

FOREIGN PATENT DOCUMENTS

| | | | | |
|---|---|---|---|---|
| CN | 111951805 A | * | 11/2020 | ........... G06F 40/279 |
| JP | 2014-219605 A | | 11/2014 | |
| KR | 10-2041618 B1 | | 11/2019 | |

OTHER PUBLICATIONS

Oleksii Hrinchuk, Mariya Popova, Boris Ginsburg, Correction of Automatic Speech Recognition With Transformer Sequence-to-Sequence Model, Oct. 23, 2019 (Year: 2019).*

(Continued)

*Primary Examiner* — Nafiz E Hoque
(74) *Attorney, Agent, or Firm* — NSIP Law

(57) ABSTRACT

Disclosed is a training data construction method and a speech recognition method using the same. The training data construction method is performed by a computing apparatus including at least one processor and includes converting first text data including a plurality of sentences to first speech data; acquiring second speech data by adding noise to the first speech data; and converting the second speech data to second text data. The second text data includes a sentence corresponding to each of the plurality of sentences included in the first text data.

6 Claims, 3 Drawing Sheets

(56) References Cited

OTHER PUBLICATIONS

Chanjun Park et al. "Voice recognition performance improvement using TTS system in address recognition system" *Korea Software Congress* (2018) pp. 551-553.

Baskar, Murall Karthick, et al. "Semi-supervised sequence-to-sequence ASR using unpaired speech and text." *arXiv preprint arXiv:1905.01152* vol. 2. (2019). pp. 1-25.

Hrinchuk, Oleksii et al., 'Correction of Automatic Speech Recognition With Transformer Sequence-to-Sequence Model.' *arXiv*:1910.10697 vol. 1. (2019). pp. 1-5.

Park, Daniel S., et al. "Specaugment: A simple data augmentation method for automatic speech recognition." *arXiv preprint arXiv:1904.08779* vol. 3. (2019). pp. 1-6.

\* cited by examiner

METHOD FOR GENERATING TRAINING DATA AND METHOD FOR POST-PROCESSING OF SPEECH RECOGNITION USING THE SAME

CROSS-REFERENCE TO RELATED APPLICATION(S)

This application claims the benefit under 35 USC § 119(a) of Korean Patent Application No. 10-2021-0060914 filed on May 11, 2021 in the Korean Intellectual Property Office, the entire disclosure of which is incorporated herein by reference for all purposes.

BACKGROUND

1. Field

At least one example embodiment relates to a training data generation method and a speech recognition postprocessing method using the same.

2. Description of Related Art

Grammar error correction (GEC) refers to correcting grammatical errors in a given sentence and most of GEC tasks are performed in a form of a rule-based correction or a statistical-based correction. However, in the case of the rule-based correction, a considerable time and cost need to be invested in establishing a rule and in the case of the statistical-based correction, a large amount of data is required.

Currently, with the advent of deep learning, many studies are conducted to approach a GEC task from perspective of a system that translates a low-resource language. A machine translation (MT) refers to translating a source language into a target language. In terms of the machine translation, the GEC may be interpreted as translating a grammatically erroneous source sentence into a target sentence in which grammatical errors are resolved. Meanwhile, deep learning researches are oriented using pretraining and fine-tuning that require a large model size and parameters and thus, a speed is slow and a memory is insufficient. To solve this limitation, research on improving performance of a model through a variety of postprocessing without changing a model is being actively conducted. However, there are also limitations.

Automatic speech recognition relates to converting speech into text and the advent of deep learning has dramatically improved a recognition rate. A speech recognizer may output a result in which a spacing is inappropriate and that is out of the context, and may not process numbers. Further, the speech recognizer may cause spelling errors without adding a symbol (e.g., comma, period, exclamation, a question mark, etc.).

Also, the speech recognizer includes an acoustic model and a language model and requires a lot of time and cost to handle a corresponding model. Also, an entry barrier is high and high cost is required for development and maintenance.

SUMMARY

At least one example embodiment provides a training data generation method that may reduce a time and cost with excellent speed and performance and a speech recognition postprocessing method using the same.

A training data construction method according to an example embodiment is performed by a computing apparatus including at least one processor, and includes converting first text data including a plurality of sentences to first speech data; acquiring second speech data by adding noise to the first speech data; and converting the second speech data to second text data. The second text data includes a sentence corresponding to each of the plurality of sentences included in the first text data.

Also, a speech recognition method according to an example embodiment is performed by a computing apparatus including at least one processor, and includes generating a speech recognition postprocessing model by training a sequence-to-sequence (seq2seq) model using generated training data; generating a text sentence corresponding to input speech data using a predetermined speech recognition model; and correcting the text sentence using the speech recognition postprocessing model and outputting the corrected text sentence.

According to some example embodiments, it is possible to infinitely generate training data and to solve issues, such as spelling errors, spacing errors, number conversion, and symbol addition. Since a sequence-to-sequence (seq2seq) model is reusable, it is possible to reduce development cost. Also, since data may be automatically generated without a fatality, it is possible to significantly reduce time and cost.

Also, it is possible to apply a domain-specific vocabulary by applying a domain-specific postprocessor to a general commercialized speech recognition system.

The aforementioned features and effects of the disclosure will be apparent from the following detailed description related to the accompanying drawings and accordingly those skilled in the art to which the disclosure pertains may easily implement the technical spirit of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
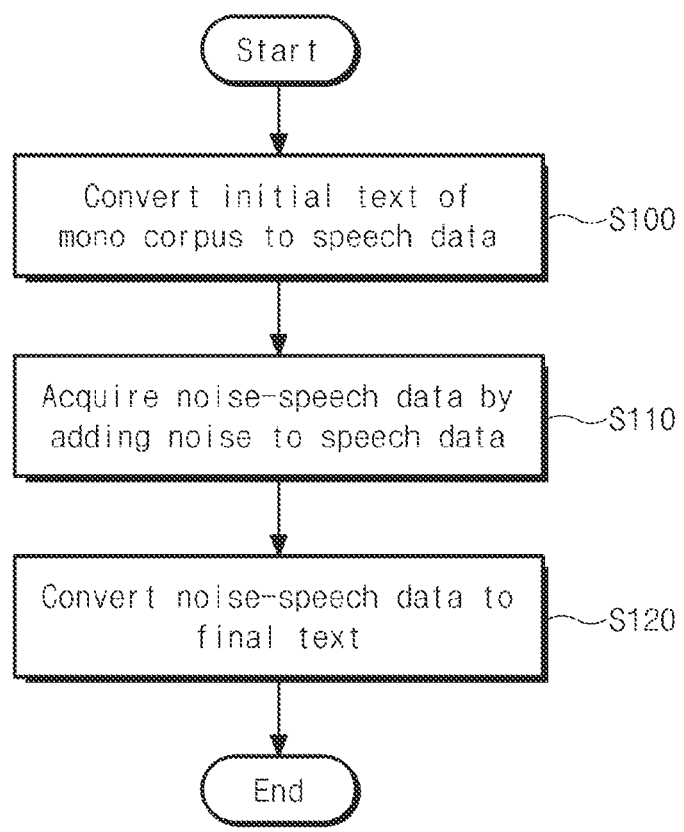
FIG. 1 is a flowchart illustrating a training data generation method according to an example embodiment.

The aforementioned features and effects of the disclosure will be apparent from the following detailed description related to the accompanying drawings and accordingly those skilled in the art to which the disclosure pertains may easily implement the technical spirit of the disclosure.

Various modifications and/or alterations may be made to the disclosure and the disclosure may include various example embodiments. Therefore, some example embodiments are illustrated as examples in the drawings and described in detailed description. However, they are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component.

For example, a first component may be referred to as a second component, or similarly, the second component may be referred to as the first component within the scope of the present disclosure. As used herein, the term "and/or" includes any and all combinations of one or more of the associated listed items.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, a training data generation method and a speech recognition postprocessing method using the same according to an example embodiment will be described with reference to the accompanying drawings. The following training data generation method may be performed by a computing apparatus including at least a processor and/or memory. That is, at least a portion of operations included in the training data generation method may be understood as an operation of the processor included in the computing apparatus. The computing apparatus may include a personal computer (PC), a laptop computer, a tablet PC, and a server.

Figure 2:
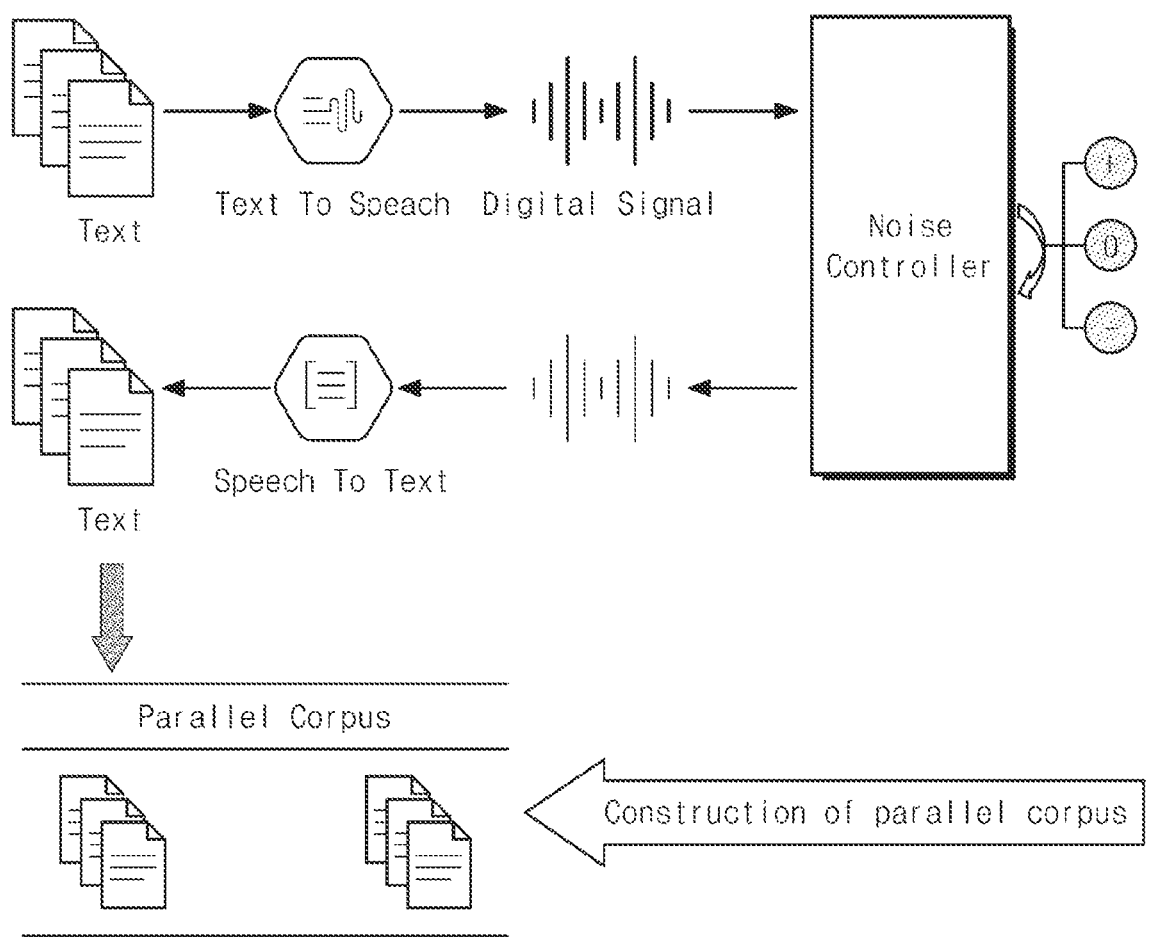
FIG. 2 is a schematic diagram to explain the training data generation method of FIG. 1.

FIG. 1 is a flowchart illustrating a training data generation method according to an example embodiment, and FIG. 2 is a schematic diagram to explain the training data generation method of FIG. 1.

Referring to FIGS. 1 and 2, in operation S100, an initial text (also, referable to as first text data) of a mono corpus is converted to speech data. The mono corpus may include a plurality of sentences. That is, the first text data may include a plurality of sentences. Operation S100 represents an operation of converting each of the plurality of sentences to speech data. That is, as a result of performing operation S100, a plurality of pieces of speech data (also, referable to as first speech data) corresponding to the respective plurality of sentences may be generated. A predetermined text-to-speech (TTS) scheme may be used to generate speech data.

In operation S110, noise-speech data may be acquired by adding noise to each piece of the converted speech data. The noise-speech data refers to speech data acquired by adding noise to the first speech data and may be referred to as noise-added speech data or second speech data.

Noise to be added may differ depending on a situation and/or an environment. It is possible to add a plurality of types of noise or to add a single type of noise. For example, the noise may include natural noise. The natural noise may refer to sound that occurs in the nature, such as sound of rain, thunder, lighting, a bird, an animal, a waterfall, a stream, and the like. Also, noise may include pollution noise. The pollution noise may refer to sound from an ambulance, a patrol car, a vehicle horn, and a construction site, and noise occurring in a specific place, such as a classroom or a square.

Also, the second speech data may be generated by masking a portion (e.g., a % ("a" denotes a real number greater than 0 and less than 100, for example, 15) of a spectrum of the first speech data. To this end, the computing apparatus may perform frequency transformation on the first speech data using an arbitrary frequency transformation (e.g., a Fourier transform (FT), a short-time Fourier transform (STFT), a wavelet Transform, etc.) and then mask a % of the speech spectrum. Here, a masking operation may refer to deleting (or removing) a signal of a predetermined frequency band or an arbitrary frequency band. The computing apparatus may generate the second speech data through retransformation to a time domain. For example, when a frequency range of the first speech data is 300-3400 hertz (Hz), the computing apparatus may generate the second speech data by removing a portion of the frequency spectrum of the first speech data, for example, a portion of frequency components, for example, 320-330 Hz, 490-500 Hz, 700-710 Hz, 950-960 Hz, 1500-1510 Hz, 2300-2310 Hz, and 3100-3110 Hz.

As described above, noise data to generate the second speech data by adding noise to the first speech data may be prestored in a storage (a storage device) included in the computing apparatus.

In operation S120, the noise-speech data may be converted to a final text. The final text may be referred to as second text data and the second text data may include a plurality of sentences corresponding to the plurality of sentences included in the first text data, respectively. A predetermined speech-to-text (STT) scheme may be used to generate the second text data.

The initial text (e.g., the first text data) and the final text (e.g., the second text data) constitute a parallel corpus. That is, the second text data is text data corresponding to the second speech data and the first text data is text data that becomes a basis of the first speech data. Therefore, in the case of training a predetermined model using the first text data and the second text data (i.e., a parallel corpus), a speech recognition postprocessing model capable of correcting typos and errors in text generated as a result of an acoustic model may be generated.

As described above, it is possible to infinitely generate training data by converting a text to speech data, by adding noise to the speech data, and by converting the speech data to the text.

Figure 3:
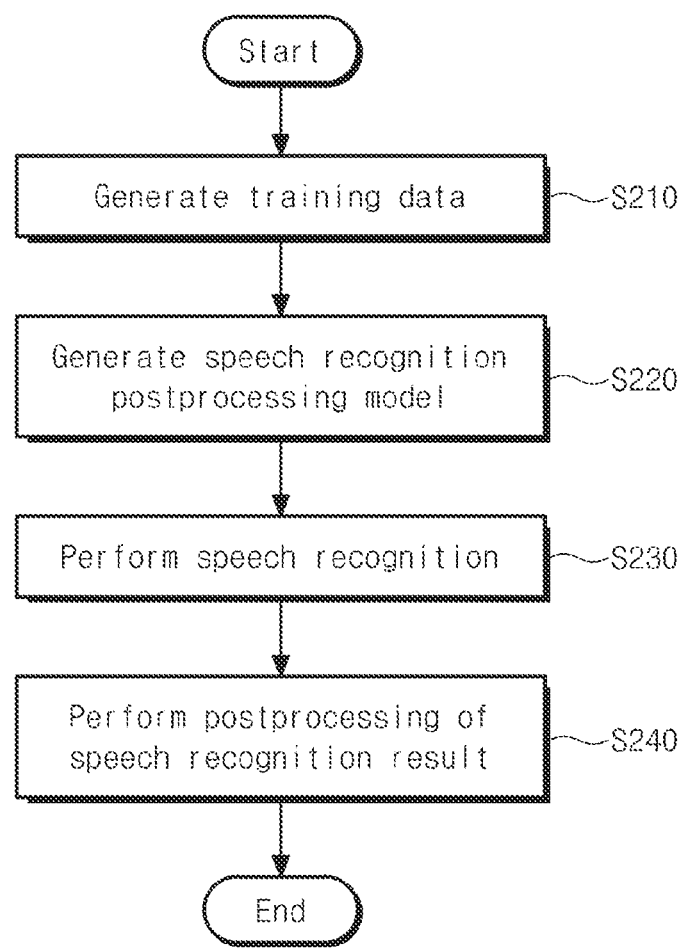
FIG. 3 is a flowchart illustrating a speech recognition postprocessing model generation method or a speech recognition method according to an example embodiment.

FIG. 3 is a flowchart illustrating a speech recognition postprocessing model generation method or a speech recognition method according to an example embodiment. Similar to the method of FIG. 1, the method of FIG. 3 may be performed by a computing apparatus that includes a processor and/or a memory (a storage device). Here, the computing apparatus that performs the method of FIG. 1 may be the same as or different from the computing apparatus that performs the method of FIG. 3.

Referring to FIG. 3, in operation S210, training data is generated. The training data may include first text data and second text data. Each of the first text data and the second text data may include a plurality of text sentences. Here, the second text data may represent sentences to be corrected and the first text data may represent target sentences of which correction is completed. That is, after a grammatical error in the second text data is corrected, the second text data may be identical to the first text data. Also, the first text data and the second text data may be generated using the same method as the method of FIG. 1.

In operation S220, a speech recognition postprocessing model may be generated. The speech recognition postprocessing model represents a model that corrects a grammatical error in a sentence output as a result of speech recognition. The speech recognition postprocessing model may be generated by training a predetermined model using the training data generated in operation S210. For example, a sequence-to-sequence (seq2seq) model may be used. The generated speech recognition postprocessing model may be stored in a storage (e.g., a storage device of a computing apparatus.

In operation S230, when predetermined speech data is input, a speech recognition operation using a known speech recognition model may be performed. The existing known model may be used for the speech recognition model and it is apparent that the scope of the disclosure is not limited by a type of the speech recognition model to be used. The result of speech recognition may represent a text sentence for the corresponding speech data.

In operation S240, the speech recognition result may be corrected using the speech recognition postprocessing model generated in operation S220. As a result, the corrected text may be output.

A speech recognizer (e.g., a speech recognition model) may output a result (a text sentence) in which a spacing is inappropriate and that is out of the context, may not process numbers, and may cause spelling errors without adding a symbol (e.g., comma, period, exclamation, a question mark, etc.). Here, by using the aforementioned speech recognition postprocessing method, it is possible to solve issues such as spelling errors, spacing errors, number conversion, and symbol addition. That is, it is possible to construct a speech database with high and excellent sound quality. Using this, it is possible to generate a high-performance speech recognition model with low cost.

Also, an existing spelling correction postprocessor performs a rule-based or statistical-based (N-gram language model) correction and does not exhibit excellent performance. In particular, in the case of the rule-based correction, large cost and time is required to build a corpus. However, in the case of using the speech recognition postprocessing method according to an example embodiment, since it is possible to automatically generate data without a role of a phonetic transcription, time and cost may be reduced.

In addition, transcription data and speech data are required to train speech recognition by expanding and applying the speech recognition system based on the constructed acoustic model and language model. After constructing a pronunciation dictionary by conducting a grapheme to phoneme (G2P) on transcribed data, the language model may be trained through a text refinement process. By training the acoustic model using speech data and by constructing a specific domain speech database (business conference, address recognition, etc.) in a speech database required to train the acoustic model through a predetermined text-to-speech (TTS) scheme, it is possible to save cost and time. Through this, a high-quality speech recognizer may be developed.

In a domain-specific environment, when constructing data through the TTS scheme and generating the speech recognition model using a domain-specific scheme, better performance than the existing generic model may be achieved. That is, it may give assistance in improving performance of the speech recognizer in a specific domain. In particular, when using a self-supervised learning according to an example embodiment, the existing commercialized system may be converted to a domain-specific speech recognizer. In the case of performing TTS using only a mono corpus of a desired domain and producing a postprocessor using a parallel corpus, the commercialized system may be serviced as the domain-specific speech recognizer. Due to the needs for the domain-specific model, a company may build its own speech recognizer rather than the commercialized system. Through the speech recognition method according to an example embodiment, development into the domain-specific model may be achieved using a high recognition rate of the commercialized system.

Although example embodiments are described with reference to the accompanying drawings, it will be apparent to those skilled in the art to which the disclosure pertains that the technical spirit or essential features may be implemented in other specific forms without being modified. Therefore, it should be understood that the aforementioned example embodiments are illustrative in every aspect and not restrictive.

What is claimed is:

1. A training data construction method performed by a computing apparatus comprising at least one processor, the training data construction method comprising:
    converting first text data, which is an initial text of mono corpus including a plurality of sentences, to first speech data using a predetermined text-to-speech scheme;
    generating second speech data based on the first speech data, the generating comprising:
        adding noise to the first speech data;
        performing a frequency transformation on the first speech data;
        removing a portion of a predetermined frequency band of the first speech data; and
        performing a retransformation to a time domain to generate the second speech data; and
    converting the second speech data to second text data, which is a final text,
    wherein the second text data includes a plurality of sentences corresponding to each of the plurality of sentences included in the first text data, thereby constituting a parallel corpus with the first text data.

2. The training data construction method of claim 1, wherein the noise includes natural noise including rain or thunder, or pollution noise including ambulance sound or patrol car sound.

3. The training data construction method of claim 1, wherein the performing of the frequency transformation on the first speech data comprises using a Fourier transform (FT), a short-time Fourier transform (STFT), or a wavelet Transform.

4. A speech recognition method performed by a computing apparatus comprising at least one processor, the speech recognition method comprising:
    generating training data;
    generating a speech recognition postprocessing model by training a sequence-to-sequence (seq2seq) model using the training data;
    generating a text sentence corresponding to input speech data using a predetermined speech recognition model; and
    correcting the text sentence using the speech recognition postprocessing model and outputting the corrected text sentence,
    wherein the generating of the training data comprises:
    converting first text data, which is an initial text of mono corpus including a plurality of sentences, to first speech data using a predetermined text-to-speech scheme;
    generating second speech data based on the first speech data, the generating comprising:
        adding noise to the first speech data;
        performing a frequency transformation on the first speech data;
        removing a portion of a predetermined frequency band of the first speech data; and performing a retransformation to a time domain to generate the second speech data; and converting the second speech data to second text data, which is a final text, wherein the second text data includes a plurality of sentences corresponding to each of the plurality of sentences included in the first text data, thereby constituting a parallel corpus with the first text data.

5. The speech recognition method of claim 4, wherein the noise comprises natural noise including rain or thunder, or pollution noise including ambulance sound or patrol car sound.

6. The speech recognition method of claim 5, wherein the training data includes the first text data and the second text data.

\* \* \* \* \*